United States Patent [19]

Asagi et al.

[11] 4,377,777
[45] Mar. 22, 1983

[54] SWITCHING DRIVE CIRCUIT

[75] Inventors: Osamu Asagi, Ebina; Masaaki Sakai, Kawasaki, both of Japan

[73] Assignee: Sony Corporation, Tokyo, Japan

[21] Appl. No.: 178,369

[22] Filed: Aug. 15, 1980

[30] Foreign Application Priority Data

Aug. 16, 1979 [JP] Japan .................................. 54-104221

[51] Int. Cl.³ ............................................. H02P 5/46
[52] U.S. Cl. ........................................ 318/68; 318/51; 318/7
[58] Field of Search .............................. 318/51, 68–72, 318/112, 3–7, 341, 310–318, 329, 341, 345 C, 345 G, 41, 53, 59, 66, 67, 85; 242/75.5, 75.51, 75.52; 307/11, 31–34

[56] References Cited

U.S. PATENT DOCUMENTS

| | | | |
|---|---|---|---|
| 3,258,669 | 6/1966 | Krassoievitch | 318/314 |
| 3,329,876 | 7/1967 | Branco | 318/7 |
| 3,354,371 | 11/1967 | Ainsworth et al. | 318/314 X |
| 3,426,262 | 2/1969 | Colter | 318/341 X |
| 3,707,659 | 12/1972 | Appelo | 318/85 X |
| 3,873,896 | 3/1975 | Jennings | 318/51 X |
| 3,982,160 | 9/1976 | Goldschmidt et al. | 318/7 |
| 3,989,992 | 11/1976 | Schmidt | 318/257 |
| 4,000,449 | 12/1976 | Gripp | 318/72 |
| 4,065,074 | 12/1977 | Anderson et al. | 242/75.51 X |
| 4,146,827 | 3/1979 | Krohn | 318/345 C X |
| 4,150,324 | 4/1979 | Naito | 318/341 |
| 4,160,195 | 7/1979 | Sakamoto | 242/75.52 X |
| 4,278,925 | 7/1981 | Minakuchi | 318/314 |

Primary Examiner—Ulysses Weldon
Attorney, Agent, or Firm—Hill, Van Santen, Steadman, Chiara & Simpson

[57] ABSTRACT

Two DC motors are driven by switching pulse drive circuits, and the switching on times of drive pulses are made to be out of phase with each other at the two switching pulse drive circuits. One of the two DC motors rotates rotary video heads, and the other drives a capstan of a video tape recording and/or reproducing apparatus. The drive pulses are preferably synchronized with horizontal synchronizing pulses of a video signal to be handled by the video tape recording and/or reproducing apparatus in order to avoid pulse noises.

2 Claims, 27 Drawing Figures

Ia (Da=50%)

Ib (Db=50%)

Ia+Ib

Ia (Da=50%)

Ib (Db=70%)

Ia+Ib

Ia (Da=30%)

Ib (Db=70%)

Ia+Ib

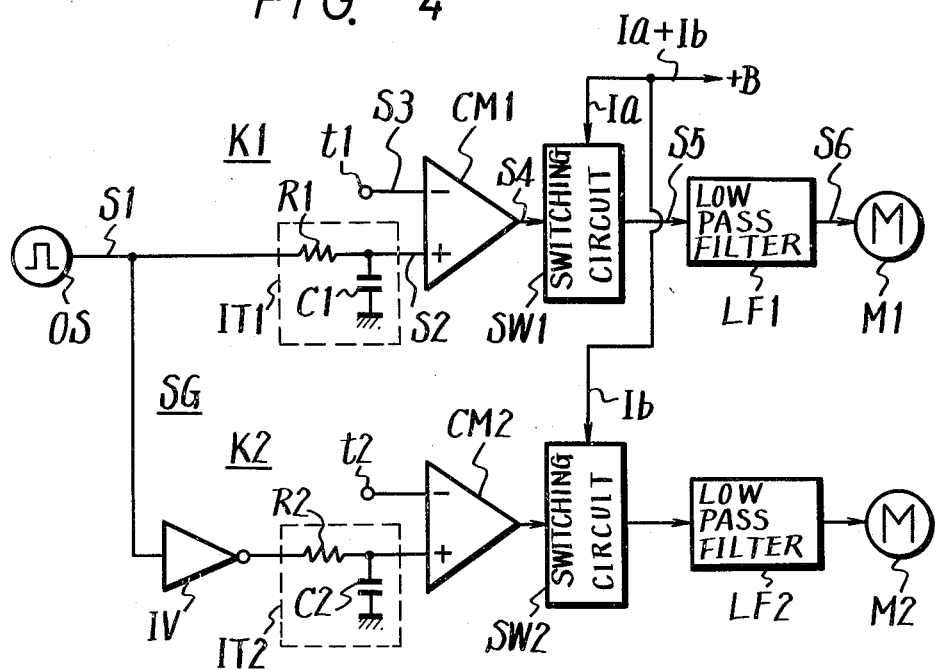
FIG. 4
FIG. 5A　　S1
FIG. 5B　　S2 / S3
FIG. 5C　　S4
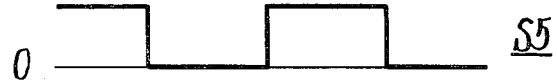
FIG. 5D　　S5
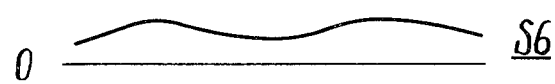
FIG. 5E　　S6

 FIG. 6A  Ia (Da=50%)
 FIG. 6B  Ib (Db=50%)
 FIG. 6C  Ia+Ib
 FIG. 7A  Ia (Da=50%)
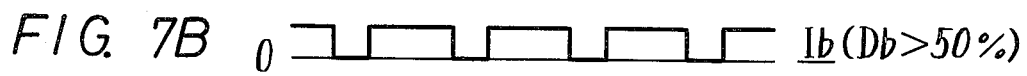 FIG. 7B  Ib (Db>50%)
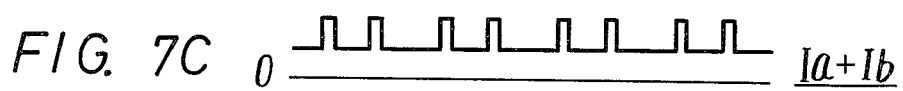 FIG. 7C  Ia+Ib
 FIG. 8A  Ia
 FIG. 8B  Ib  (Da+Db=100%)
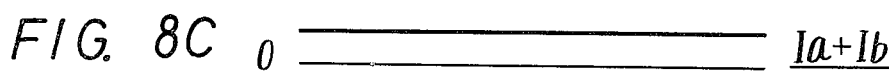 FIG. 8C  Ia+Ib
 FIG. 9A  Ia (Da<50%)
 FIG. 9B  Ib (Db<50%)
 FIG. 9C  Ia+Ib

SWITCHING DRIVE CIRCUIT

BACKGROUND OF THE INVENTION

This invention relates generally to a switching regulator circuit, and is directed more particularly to a switching regulator circuit which is provided with a plurality of switching circuits.

First, a conventional switching regulator circuit used in a pulse drive circuit for a motor will be described. In a prior art VTR (video tape recorder), switching regulators are respectively used for a drum DC motor and a capstan DC motor to apply servo thereto. That is, pulse width modulator circuits are respectively provided for the drum motor and capstan motor. Carrier pulse signals each having the same frequency with random phase to each other are respectively applied to the pulse width modulator circuits. The carrier pulse signals carry out a modulation such that their duty cycles are varied in response to the rotation speeds and/or phases of the respective DC motors. The outputs from the pulse width modulator circuits are used to on-and-off control the respective switching circuits. The outputs from the switching circuits are supplied through low pass filters to the drum motor and capstan motor as drive currents, respectively. In this case, the switching circuits are respectively supplied with DC currents from a common DC power source.

It is assumed that the pulse currents flowing through the two switching circuits are Ia, Ib; their duty cycles are Da, Db, respectively; and that the peak values of the pulse currents Ia, Ib are equal. As described above, since the carrier pulse signals fed to the two pulse width modulator circuits are possible to be the same in phase, if the duties Da and Db of the pulse currents Ia and Ib are both 50%, both the pulse currents Ia and Ib have entirely the same waveform as shown in FIGS. 1A and 1B. Accordingly, a current Ia+Ib flowing out from the common IC power source becomes a pulse current which has a peak value twice that of each of the pulse currents Ia and Ib shown in FIG. 1C.

Next, in the case where the duty cycle Da of the pulse current Ia is 50% while the duty cycle Db of the pulse current Ib is 70% as shown in FIGS. 2A and 2B, the current Ia+Ib flowing out from the common DC power source acquires a peak value twice that of each of the pulse currents Ia and Ib as shown in FIG. 2C.

While in the case where the duty cycle Da of the pulse current Ia is 30% and duty cycle Db of the pulse current Ib is 70% as shown in FIGS. 3A and 3B, the current Ia+Ib flowing out from the common DC power source becomes a pulse current having a peak value twice that of each of the pulse currents Ia and Ib as shown in FIG. 3C.

As will be apparent from the above description, when the carrier pulse signals applied to the two pulse width modulator circuits are the same in phase, the absolute value of the differential coefficient at the rising-up or falling-down edge of the pulse current flowing out from the common, DC power source becomes large and hence an undesired noise radiation becomes large. Further, since the peak value of the pulse current flowing out from the common DC power source is twice that of each of the pulse currents Ia and Ib, the utilization efficiency of the common DC power source becmes low.

SUMMARY OF THE INVENTION

Accordingly, an object of the present invention is to provide a novel switching regulator circuit having a plurality of switching circuits.

Another object of the invention is to provide a switching regulator circuit having a plurality of switching circuits, each supplied with a DC current from a common DC power source, and a plurality of pulse width modulator circuits supplying switching control signals to the plurality of switching circuits, in which an undesired noise radiation is reduced and the utilization efficiency of the common DC power source is increased.

In the switching regulator circuit according to the invention, there are provided N number of switching circuits (where N is larger than 2) which are respectively supplied with DC currents from a common DC power source, N number of pulse width modulator circuits respectively supplying switching control signals to the N number of switching circuits, and a carrier pulse signal generator circuit generating N number of carrier pulse signals which have the phase difference of 360°/N between adjacent ones, the same frequency, and are respectively applied to the N number of pulse width modulator circuits.

The switching regulator circuit according to the invention can be utilized not only for the DC power supply etc. but also for the pulse drive circuit of a motor.

According to an aspect of the present invention there is provided a switching drive circuit having a plurality of switching circuits commonly supplied with a DC power, comprising:

a drive pulse generator for generating a drive pulse to be supplied to respective switching circuits; and a phase control circuit connected between said drive pulse generator and switching circuits for controlling the phase of drive pulses so that conducting durations of said switching circuits are basically offset to each other.

BRIEF DESCRIPTION OF THE DRAWINGS

FIG. 4 is a connection diagram showing, partially in block diagram, an example of the switching regulator circuit according to the present invention; and FIGS. 5 to 9, inclusive, are waveform diagrams used to explain the operation of the example of the invention shown in FIG. 4.

DESCRIPTION OF THE PREFERRED EMBODIMENT

Figure 1A:
FIGS. 1, 2 and 3 are respectively waveform diagrams used for the explanation of a prior art switching regulator circuit.
Figure 1B:
Figure 1C:
Figure 2A:
Figure 2B:
Figure 2C:
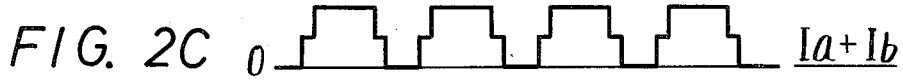
Figure 3A:
Figure 3B:
Figure 3C:
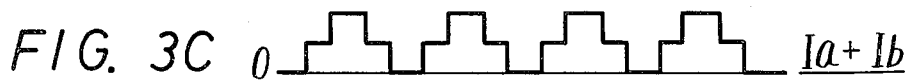

The present invention will be hereinafter described with reference to the attached drawings.

Turning to FIG. 4, an example of the switching regulator circuit according to the invention will be now described in which the present invention is applied as a switching regulator circuit for a drum motor and a capstan motor of a VTR (video tape recorder).

In FIG. 4, M1 and M2 designate a drum motor and a capstan motor, respectively, and SW1 and SW2 designate switching circuits for the drum and capstan motors M1 and M2, respectively. These switching circuits SW1 and SW2 are respectively supplied with DC currents from a common DC power source of +B. Pulse width modulator circuits K1 and K2 are provided which are formed of integrator circuits IT1, IT2 and level comparator circuits CM1 and CM2, respectively. Further, a signal generator circuit SG is provided to produce two carrier pulse signals which have a phase difference of about 180° and the same frequency, for example, the frequency equal to the horizontal frequency of the television signal in the example of FIG. 4, and which are respectively supplied to the pulse width modulator circuits K1 and K2. This signal generator SG consists of a pulse oscillator OS, which produces a rectangular waveform pulse signal S1 having a frequency equal to the horizontal frequency and a duty or duration cycle of 50% (as shown in FIG. 5A), and an inverter circuit IV for phase-inverting the rectangular waveform pulse signal S1.

The rectangular waveform pulse signal S1 from the pulse oscillator OS is supplied to the integrator circuit IT1, which consists of a resistor R1 and a capacitor C1, to be waveform-converted to a triangular waveform signal S2 as shown in FIG. 5B. This triangular waveform signal S2 is supplied to one of two input terminals, for example, a non-inverting input terminal of the level comparator CM1 which is also supplied at its other input terminal or inverting input terminal with a rotation detecting signal S3 (refer to FIG. 5B) of the drum motor M1 through an input terminal t1. Thus, the level comparator CM1 compares the levels of both the signals and then produces a rectangular waveform pulse signal S4 whose duty cycle is varied in response to the rotation of the drum motor M1 as shown in FIG. 5C. This signal S4 is fed to the switching circuit SW1 as the switching control signal from which a rectangular waveform pulse signal S5, corresponding to the phase-converted one of the rectangular waveform pulse signal S4 as shown in FIG. 5D, is derived. This pulse signal S5 is in turn fed to a low pass filter LF1 to be rectified as a motor control current S6 shown in FIG. 5E. This motor control current S6 is fed to the drum motor M1 to drive it.

Similarly, the rectangular pulse signal S1 from the pulse oscillator OS is phase-inverted by the inverter circuit IV, then fed to the integrator circuit IT2 consisting of a resistor R2 and a capacitor C2 to be a triangular waveform signal. This triangular waveform signal is fed to one of the input terminals, for example, the non-inverting input terminal of the level comparator CM2, which is also supplied at its inverting input terminal with the rotation detecting signal of the capstan motor M2 through an input terminal t2. The compared output from the level comparator CM2, which is a rectangular waveform pulse signal, is fed to the switching circuits SW2 as its switching control signal. The phase-converted rectangular waveform pulse signal delivered from the switching circuit SW2 is rectified through a low pass filter LF2 as a motor control DC signal which is in turn fed to the capstan motor M2 to drive the same.

The low pass filters LF1, LF2 and the motors M1, M2, which are respectively connected at the rear stages of the switching circuits SW1 and SW2, become loads for the switching circuits SW1 and SW2, respectively.

Turning to FIGS. 6 through 9, a discussion will be given for the case when the duty cycles Da and Db of the pulse currents Ia and Ib respectively flowing through the switching circuits SW1 and SW2 are varied respectively, and how the current Ia+Ib flowing out from the common DC power source +B is varied. In this case, it is assumed that the peak values of the pulse currents Ia and Ib are equal with each other. When the duty cycles Da, Db of the pulse currents Ia, Ib are both 50% as shown in FIGS. 6A and 6B, the pulse currents Ia, Ib become pulse currents whose phases are inverted to each other. Therefore, the total current Ia+Ib flowing out from the common DC power source +B becomes a DC current with the level equal to the peak value of each of the pulse currents Ia, Ib as shown in FIG. 6C.

When the duty cycle Db of the pulse current Ia is 50% as shown in FIG. 7A but the duty cycle Db of the pulse current Ib is larger than 50% as shown in FIG. 7B, the total current Ia+Ib flowing out from the common DC power source +B becomes a pulse current with a peak value twice the peak value of each of the pulse currents Ia, Ib as shown in FIG. 7C. This total pulse current Ia+Ib is a DC current superimposed by a pulse current with the peak value equal to that of each of the pulse currents Ia, Ib, so that the differential coefficient at the rising-up or falling-down edge of the total pulse current Ia+Ib becomes half that of the prior art. When the sum of the duty cycles Da, Db of the pulse currents Ia, Ib is 100% as shown in FIGS. 8A and 8B, the total current Ia+Ib flowing out from the common DC power source +B becomes a DC current with the level equal to the peak value of each of the pulse currents Ia, Ib as shown in FIG. 8C.

When the duty cycles Da, Db of the pulse currents Ia, Ib are both smaller than 50% as shown in FIGS. 9A and 9B, the total current Ia+Ib flowing out from the common DC power source +B becomes a pulse current whose peak value is equal to that of each of the pulse currents Ia, Ib as shown in FIG. 9C.

As described above, according to the present invention when two switching circuits are used, when the phases of the carrier pulse signals fed to the pulse width modulator circuits are made different by 180° to each other, the absolute value of the differential coefficient of the total current flowing out from the common DC power source +B becomes half that of the prior art. Accordingly, by this invention the undesired radiation is correspondingly reduced.

Further, according to the invention the peak value of the total current derived from the common DC power source +B is in almost all cases equal to that of each of the pulse currents Ia and Ib, or even if the former becomes higher than the latter accidentally, the former is twice the latter and also the latter case is very limited.

In the above example, two switching circuits are provided. However, when three switching circuits are provided, a similar effect can be achieved by the arrangement of three pulse width modulator circuits and wherein the phases of carrier pulse signals fed thereto are shifted by 120° with one another.

When four switching circuits are provided, it may be possible that the phases of carrrier pulse signals fed to four pulse width modulator circuits are shifted by 90° with one another, but it may be also possible that two of the four switching circuits are selected to form a pair, two pairs of the switching circuits being respectively supplied with DC currents from two DC power sources, and the phase difference between the carrier pulse signals being selected 180° as in the case of FIG. 4 to effect a similar result.

As described above, the switching regulator circuit according to the present invention has less undesired noise radiation and is high in utilization efficiency for the common DC power source.

Further, when N number (N is an integer larger than 2) of switching circuits are provided, N number of pulse width modulator circuits are provided, and carrier pulse signals fed thereto are processed similar to the above to carry out a similar effect.

Although various minor modifications may be suggested by those versed in the art, it should be understood that we wish to embody within the scope of the patent warranted hereon, all such embodiments as reasonably and properly come within the scope of our contribution to the art.

We claim as our invention:

1. A video tape recorder motor drive system, comprising:
    a video tape recorder having means for processing television signals on a magnetic tape and including a drum motor and a capstan motor for driving the tape;
    first and second switching circuit means for respectively applying power to the drum and capstan motors;
    a common dc power source connected to supply power to the first and second switching circuits to be switched through to the respective drum and capstan motors;
    first and second pulse width modulator circuit means respectively connected to the first and second switching circuits for providing a square wave drive signal of a variable duty cycle;
    a signal generator means for producing a signal to be fed to the pulse width modulator circuits, the signal generator having a frequency corresponding to a horizontal frequency of the television signals associated with the video tape; and
    means for providing a 180° phase difference for signals from the signal generator fed to the second pulse width modulator circuit relative to the first pulse width modulator circuit such that the "on" period for the first switching circuit has a 180° phase difference relative to an "on" period of the second switching circuit.

2. The system of claim 1 wherein the signal generator provides a square wave and the pulse width modulator circuit comprises an integrator circuit connected to receive the square wave and a comparator circuit which receives a triangular wave from the integrator circuit and produces a square wave drive for the switching circuits, and wherein an inverter is connected between the signal generator and one of the integrator circuits.

* * * * *